US009210154B2

(12) United States Patent
Okamoto et al.

(10) Patent No.: US 9,210,154 B2
(45) Date of Patent: Dec. 8, 2015

(54) PROVIDING LOCALIZED CONTENT DELIVERY WITH REMOTE TOKEN AUTHENTICATION

(71) Applicant: EdgeCast Networks, Inc., Santa Monica, CA (US)

(72) Inventors: Kyle Okamoto, Marina Del Rey, CA (US); Alexander A. Kazerani, Santa Monica, CA (US)

(73) Assignee: EDGECAST NETWORKS, INC., Santa Monica, CA (US)

( * ) Notice: Subject to any disclaimer, the term of this patent is extended or adjusted under 35 U.S.C. 154(b) by 117 days.

(21) Appl. No.: 14/193,836

(22) Filed: Feb. 28, 2014

(65) Prior Publication Data

US 2015/0249651 A1 Sep. 3, 2015

(51) Int. Cl.
*H04L 29/06* (2006.01)
*H04L 29/08* (2006.01)

(52) U.S. Cl.
CPC .............. *H04L 63/08* (2013.01); *H04L 63/061* (2013.01); *H04L 63/10* (2013.01); *H04L 67/1095* (2013.01)

(58) Field of Classification Search
CPC ....... H04L 63/08; H04L 63/10; H04L 63/061; H04L 67/1095
USPC ......................................................... 713/171
See application file for complete search history.

(56) References Cited

U.S. PATENT DOCUMENTS

| | | | |
|---|---|---|---|
| 7,240,100 B1 * | 7/2007 | Wein .................... | H04L 67/1008 709/214 |
| 8,489,889 B1 * | 7/2013 | Moscaritolo .......... | G06F 21/604 379/93.02 |
| 8,516,158 B1 * | 8/2013 | Wu ......................... | H04L 69/04 709/223 |
| 2002/0169797 A1 * | 11/2002 | Hegde ............... | H04L 29/06027 715/276 |
| 2006/0080546 A1 * | 4/2006 | Brannon ............. | G06F 21/6218 713/185 |
| 2008/0280626 A1 * | 11/2008 | Choi ....................... | H04L 63/12 455/456.1 |
| 2009/0254997 A1 * | 10/2009 | Yassa ..................... | G06F 21/10 726/27 |
| 2011/0320628 A1 * | 12/2011 | Gutarin ................. | H04L 65/601 709/231 |
| 2012/0008786 A1 * | 1/2012 | Cronk ................... | H04L 63/102 380/282 |
| 2012/0255036 A1 * | 10/2012 | Kidder .................... | H04L 63/08 726/29 |
| 2013/0167193 A1 * | 6/2013 | Brookins et al. ........ | H04L 63/20 726/1 |

* cited by examiner

*Primary Examiner* — Matthew Smithers

(57) ABSTRACT

Some embodiments set forth systems and methods enabling a first network to use the resources of various second networks in order to localize delivery of the first network content from the various second networks in a secure manner. Some embodiments provide a token-based authentication scheme to ensure that any configured content access restrictions are effectuated at the first network and any of the second networks providing localized content delivery for the first network. The scheme involves a two phase user authentication, wherein the user is separately authenticated at the first network and the redirected to second network using either the same or different set of access restrictions. The first network exchanges a first encryption key with content providers for encrypting/decrypting the first access restriction and a second encryption key with a second network for encrypting/decrypting the second access restriction.

20 Claims, 8 Drawing Sheets

PROVIDING LOCALIZED CONTENT DELIVERY WITH REMOTE TOKEN AUTHENTICATION

TECHNICAL FIELD

The present invention relates to content delivery over a data network and to securing access to content when redirecting content requests from a first network to a second network.

BACKGROUND ART

Content delivery networks (CDNs) serve much of the digital content that is consumed over data networks including the Internet. CDNs deploy servers at various geographic regions to cache and serve content on behalf of various content providers. This provides a distributed platform whereby the same content can be served from one of many locations. Users that consume the content receive the requested content from a server that provides the best delivery performance to them or the geographic location in which they operate. As a result, content providers can focus on generating content while leaving the delivery of their content to the highly optimized and efficient CDNs.

FIG. 1 depicts an exemplary CDN architecture. As shown, the CDN includes several different caching Points-of-Presence (PoPs) 110, traffic management servers 120, and an administrative server 130. The figure also illustrates the interactions that CDN customers, including content providers, have with the CDN and interactions that content consumers or users have with the CDN.

Each PoP 110 may be representative of a server farm for a geographically proximate set of physically separate servers or a set of virtual servers that execute over partitioned sets of resources of one or more physically separate servers. The PoPs are distributed across different network edges of the Internet. The servers in each respective PoP cache and serve content on behalf of different content providers, thus facilitating the "last mile" delivery of content. Hence, the PoP servers are referred to as "edge servers" or "caching servers". An edge server may cache the same content as other edge servers in the same PoP or may be configured to cache different content than the other edge servers in the same PoP.

The traffic management servers 120 route users, and more specifically, user issued requests for content to one or more edge servers that can optimally deliver the requested content back to the users. In many cases, the optimal edge server is a server caching the requested content in a PoP that is geographically closest to the user that issued the content request. Different CDN implementations utilize different traffic management schemes to achieve such routing to the optimal edge servers. For example, the traffic management scheme can be conducted according to Anycast routing. However, it should be apparent that other traffic management schemes, such as Domain Name System (DNS) routing, can alternatively be used and that the traffic management servers 120 can include different combinations of DNS servers, load balancers, and routers performing Anycast, DNS, or Border Gateway Protocol (BGP) routing as some examples.

The administrative server 130 may include a central server of the CDN or a distributed set of interoperating servers that perform the configuration control and reporting functionality of the CDN. Content providers register with the administrative server 130 in order to access services and functionality of the CDN. Accordingly, content providers are also referred to as customers of the CDN. Once registered, content providers can interface with the administrative server 130 to specify a configuration, upload content, and set access restrictions including authentication tokens and encryption keys for effectuating the access restrictions. The administrative server 130 also aggregates statistics data from each server of the set of edge servers and processes the statistics to produce usage and performance reports for the customers. From these reports, the content provider can better understand the demand for its content, the performance provided by the CDN in delivering the content provider's content, and the need for capacity reallocation, among other uses. The administrative server 130 can also be the logical point that collects CDN usage values for the purpose of billing CDN customers.

One of the primary factors differentiating CDNs is performance. Performance of different CDNs deviates by the order of a few milliseconds in best case scenarios to a few seconds in worst case scenarios. While the performance penalty of a single object may be insignificant, it is important to note that CDNs deliver millions of objects hourly and the compounded delay can therefore be quite significant.

The best performing CDNs are the ones that can place their resources (i.e., PoPs or edge servers) closest to the greatest number of users such that content is delivered from those resources to the users over the fewest number of network hops minimizing the potential for delay and failure. On a global scale, this becomes financially and resource prohibitive for even the largest CDN. CDNs must be highly selective in where they deploy their capacity and must often sacrifice performance to certain users in order to improve performance to others. Another obstacle hindering CDN performance is the inability of CDNs to deeply penetrate into the networks that serve as the initial network entry point of users. These are the true edges of the network and in many cases cannot be penetrated into because they are tightly controlled by service providers such as Time Warner, Comcast, Cox, AT&T, Verizon, and other wired broadband and wireless Internet service providers (ISPs).

Some service providers have realized the performance advantage they have by being at the network edge. To exploit their advantage, some service providers have deployed their own caching servers within these networks. In essence, the service providers have deployed their own mini-CDN service. Yet, many of these resources remain underutilized because of the limited user reach relative to larger CDN footprints. Stated differently, the service providers are able to provide highly optimized delivery to a small set of users and poor delivery to users outside their networks, whereas the CDN can provide better overall performance to more users because of the wide deployment and larger cache footprint of the CDN that reaches greater numbers of users than the localized service provider networks. Accordingly, content providers have continued to rely on traditional CDNs for delivery of their content rather than partner with several different service providers that each reach a small set of users.

Thus, there is a need to synergize the content delivery efficiencies and resources of CDNs and service providers. More specifically, there is a need to include the highly optimized but localized content delivery capabilities of service providers with the content delivery capabilities of a CDN. However, simply redirecting requests from the CDN to a service provider could cause secured content to become unsecured and freely accessible from the redirected to service provider when the service provider is not configured with or cannot process the access restrictions of the CDN. Accordingly, there is further a need to ensure that any access restrictions that are configured to secure access to content are effectuated not only at the CDN, but also any secondary service provider network that the CDN leverages to provide localized content delivery to users.

SUMMARY OF THE INVENTION

It is an objective for a first network to leverage the highly optimized and localized content delivery capabilities of various second networks in order to improve content delivery performance to users that are more proximally located to resources of the second networks than those of the first network. It is further an objective to leverage the localized content delivery capability of these second networks while continuing to effectuate content access restrictions enforced by the first network across the second networks.

To achieve these and other objectives, some embodiments set forth systems and machine implemented methodologies that enable a first network to leverage localized or otherwise optimized content delivery resources of different second networks in a secure manner, whereby access restrictions enforced at the first network remain in effect at the second networks. To ensure that the access restrictions are enforced at the first and second networks, some embodiments implement a multi-phase token-based authentication scheme. The first phase involves a first encryption key that is configured by a content provider client of the first network and that is used in authenticating a user at the first network when the user issues a request for the content provider content to the first network. The second phase involves a second encryption key that is configured by the first network and that is used in authenticating the user at one of the second networks that the first network passes the user to in order receive localized delivery of the requested content.

Initializing the system and methods of some embodiments involves a content provider tasking the first network to provide secure delivery of its content. In order to secure access to the content, the content provider configures a first set of access restrictions and the first encryption key. The first set of access restrictions specify requirements that a user must meet in order to gain access to the content. The first encryption key is used to encrypt the requirements as a token. This token is then included as part of a Uniform Resource Locator (URL) that is used to request the content from the first network.

Upon receiving such a request at a server of the first network, the server processes the request to identify the content provider's content that is being requested. The server then retrieves the first encryption key that was configured for the identified content provider. The server uses the first encryption key to decrypt the included token and extract the first set of access restrictions from the token. The first network server authenticates the user. Authentication involves determining if the requesting user satisfies the first set of access restrictions.

The first network server denies the user access when the user does not satisfy the first set of access restrictions. This may include providing the user with an error page or alternate content.

If the user satisfies the first set of access restrictions, the first network server then determines whether the requested content is available from a second network that can localize or otherwise optimize the delivery of the requested content to the user. If not, the first network server selects an optimal server of the first network to deliver the requested content to the user. If a second network is identified to provide localized or optimized content delivery, the first network server passes the request to that secondary network. Some embodiments use request redirection, request forwarding, or DNS resolution to pass the user request from the first network to the second network. It should be apparent that implementations based on request redirection can be applied with slight modification to implementations based on request forwarding and DNS resolution.

At this stage, the second phase of the multi-phase token-based authentication scheme is employed to ensure that the content is not freely accessible from the second network. The second phase of the multi-phase token-based authentication scheme involves its own configuration, whereby the first network issues a different second encryption key to each of the second networks that the first network can leverage for localized content delivery. Thus, as part of redirecting the user request, the first network server retrieves the second encryption key that is provided to the second network that will be providing the localized delivery. The first network server uses the second encryption key to encrypt a second set of access requirements that the secondary network is to enforce. The second set of access requirements may be the same as the first set of access requirements. However, in preferred embodiments, it is redundant and unnecessary to perform the same authentication at the second network. Accordingly, in preferred embodiments, the second set of access requirements are different than the first set of access requirements and are minimized for more efficient authentication of the user at the second network. For example, the second set of access restrictions may authorize only the requesting user access to the content from the second network by specifying only the user's Internet Protocol (IP) address as a valid IP address for accessing the content. As another example, the second set of access restrictions may authorize access to the content from the second network for only a short period of time, thereby allowing only the user to access the content from the second network. The second set of access requirements are encoded as a second token. The second token is appended as a query string parameter to the redirect URL, wherein the redirect URL points to the host or domain name of the second network that will provide the localized delivery of the requested content. The first network server then passes the redirect message containing the redirect URL and the second token to the user.

After receiving the redirect message, the user reissues the content request with the second token to the second network. A server operated by the second network receives the request. The second network server decrypts the second token using the second encryption key that the first network configures and provides to the second network. The second network server then performs a secondary authentication of the user at the second based on the second set of access restrictions extracted from the second token. If the user satisfies the second set of access restrictions, the second network server serves the content to the user. Otherwise, the second network server denies the user access and provides an error page or alternate content to the user.

BRIEF DESCRIPTION OF THE DRAWINGS

In order to achieve a better understanding of the nature of the present invention, a preferred embodiment for the systems and methods providing secure localized or otherwise optimized content delivery through various secondary networks will now be described, by way of example only, with reference to the accompanying drawings in which.

DETAILED DESCRIPTION

In the following detailed description, numerous details, examples, and embodiments are set forth and described. As one skilled in the art would understand in light of the present description, the described systems and methods are not limited to the embodiments set forth, and these systems and methods may be practiced without some of the specific details and examples discussed. Also, reference is made to the accompanying figures, which illustrate specific embodiments in which the invention can be practiced. It is to be understood that other embodiments can be used and structural changes can be made without departing from the scope of the embodiments herein described.

Figure 2:
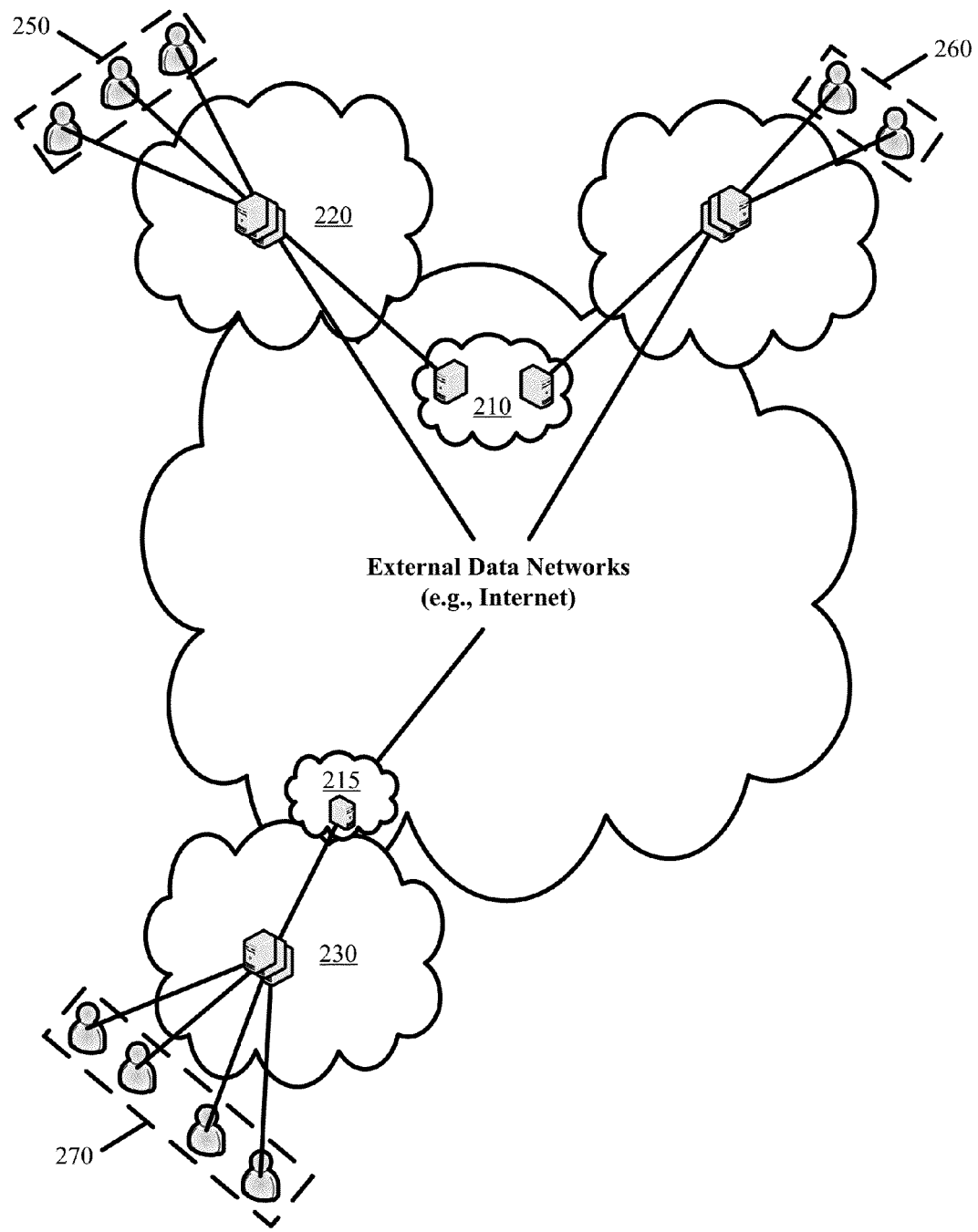
FIG. 2 illustrates an exemplary architecture in which the systems and methods of some embodiments can be implemented.

FIG. 2 illustrates an exemplary architecture in which the systems and methods of some embodiments can be implemented. The architecture depicts two points-of-presence (PoPs) 210 and 215 under control of a first network, a second network 220 that is operated independent of the first network, and a third network 230 that is operated independent of the first and second networks.

Each PoP 210 and 215 includes one or more servers that provide distributed delivery for the content of various content providers as well as supplemental services such as user authentication. The content delivery performance of each PoP 210 and 215 depends on a variety of factors. A primary factor is the geographic proximity of the PoP to the user receiving content from the PoP. Stated differently, the performance depends on the number of network hops that the content must traverse in order to be delivered from the PoP to the user. In this figure, PoP 210 is the optimal PoP of the first network from which to deliver content to users 250 and 260, while PoP 215 is the optimal PoP of the first network from which to deliver content to users 270.

Figure 1:
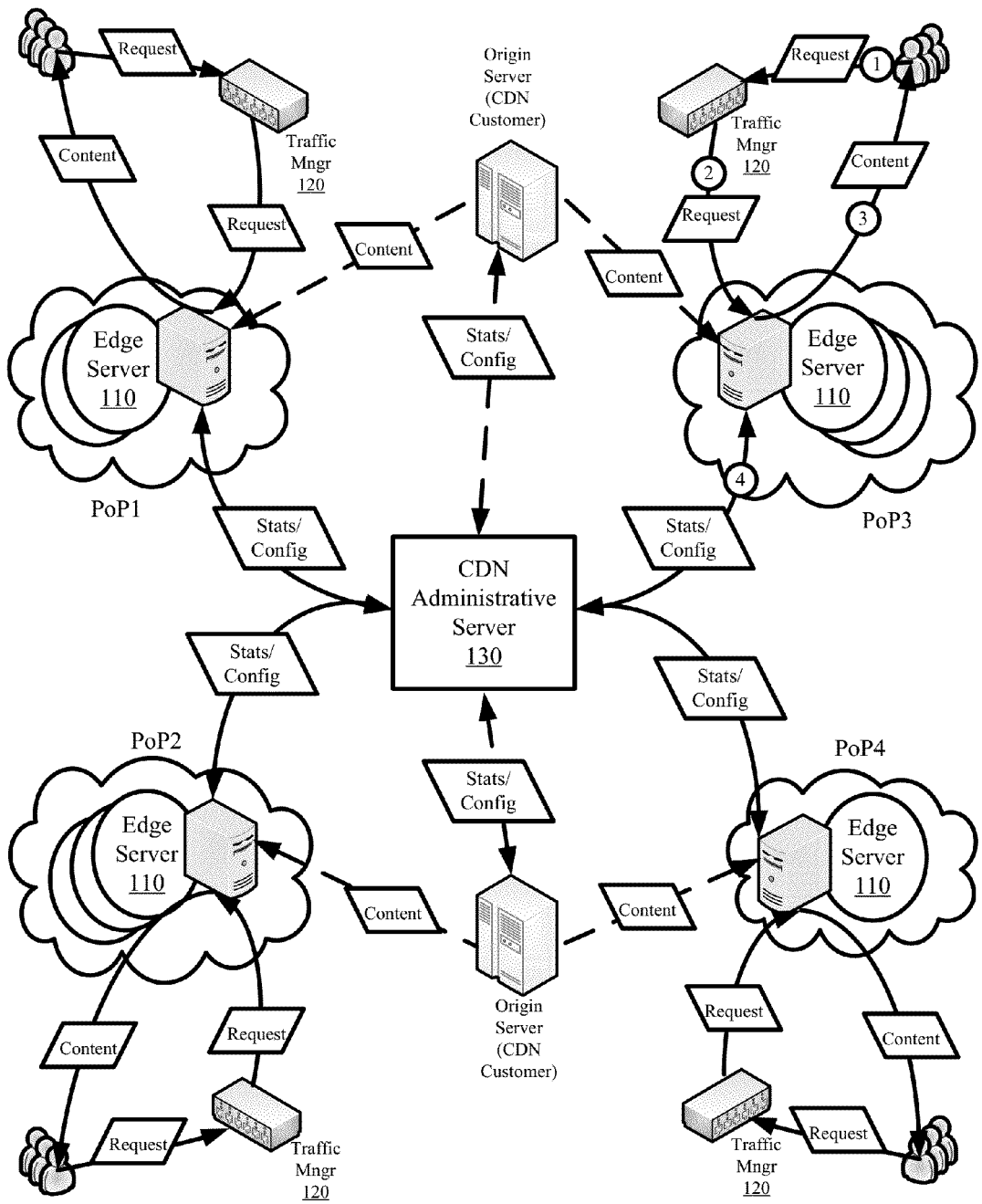
FIG. 1 depicts an exemplary content delivery network (CDN) architecture.

The first network PoPs 210 and 215 can collectively representative a content delivery network (CDN) such as the one described above with reference to FIG. 1, a hosting service, or other content distribution platform. The first network PoPs 210 and 215 can alternatively be under the direct control of a particular content provider, such that the PoPs 210 and 215 provide distributed delivery only for the content of that particular content provider.

In this example, the second network 220 is operated by a service provider for the purpose of providing users 250 with network access. The third network 230 is another service provider through which a different set of users 270 are provided network access. In other words, the second network 220 is the initial point of network entry for users 250 while the third network 230 is the initial point of network entry for users 270. The second and third networks 220 and 230 can therefore represent various Internet service providers (ISPs) including wired broadband or wireless service providers. In some embodiments, the second and third networks 220 and 230 generally include any network that controls servers providing more optimal content delivery performance to some set of users as compared to any of the first network PoPs 210 and 215. As such, the second and third networks 220 and 230 can themselves be CDNs.

From the figure, it should be apparent that the resources of the second network 220 are more proximally located to users 250 than PoP 210. It is therefore likely that the servers that are under the control of the second network 220 and that operate from within the second network 220 provide better content delivery performance to users 250 than the servers of PoP 210. This performance discrepancy is mainly due to the fact that content delivered from servers within the second network 220 to users 250 traverses fewer network hops than content that is delivered from servers within PoP 210 to users 250. Similarly, the third network 230 is more proximally located to users 270 than PoP 215. Accordingly, servers within the third network 230 are likely to provide better content delivery performance to users 270 than the servers of PoP 215. Thus, the first network could improve its content delivery performance if it could leverage the already deployed resources of the second network 220 and third network 230 for content delivery to the users operating within and adjacent to those networks 220 and 230. The performance improvement is magnified when the requested content is a large file or stream, such as a movie.

To take advantage of the content delivery performance advantage that these second networks have over the first network, some embodiments set forth systems and methods enabling the first network to use the content delivery resources of various second networks (e.g., second network 220 and third network 230) in order to localize or otherwise optimize delivery of the first network content from the various second networks in a secure manner. In support of these systems and methods, some embodiments provide a multi-phase token-based authentication scheme that ensures content access restrictions configured by customers of the first network are effectuated across each of the second networks that the first network leverages to provide optimized delivery.

The multi-phase token-based authentication scheme performs a two phase authentication of any user that requests content from the first network but is passed from the first network to one of the second networks to receive the content. The first phase of the multi-phase token-based authentication scheme involves authenticating the user at the first network according to a first set of access restrictions. The second phase of the scheme involves reauthenticating the user at the second network according to a second set of access restrictions.

The first set of access restrictions are typically configured by the content provider and are included as a first token that is sent as part of the user request to the first network. The first network uses a first encryption key that is exchanged with the content provider to decrypt the first set of access restrictions from the first token. The second set of access restrictions are encrypted as a second token that is included as part of a message that passes the user from the first network to the selected second network. The second token can be included with a redirect message, a DNS request message, or a forwarding message in some embodiments.

In some embodiments, the first set of access restrictions is different than the second set of access restrictions. This difference eliminates redundant authentication of the user while still securing access to any content that a second network delivers to a user that the first network passes to the second network.

Figure 3:
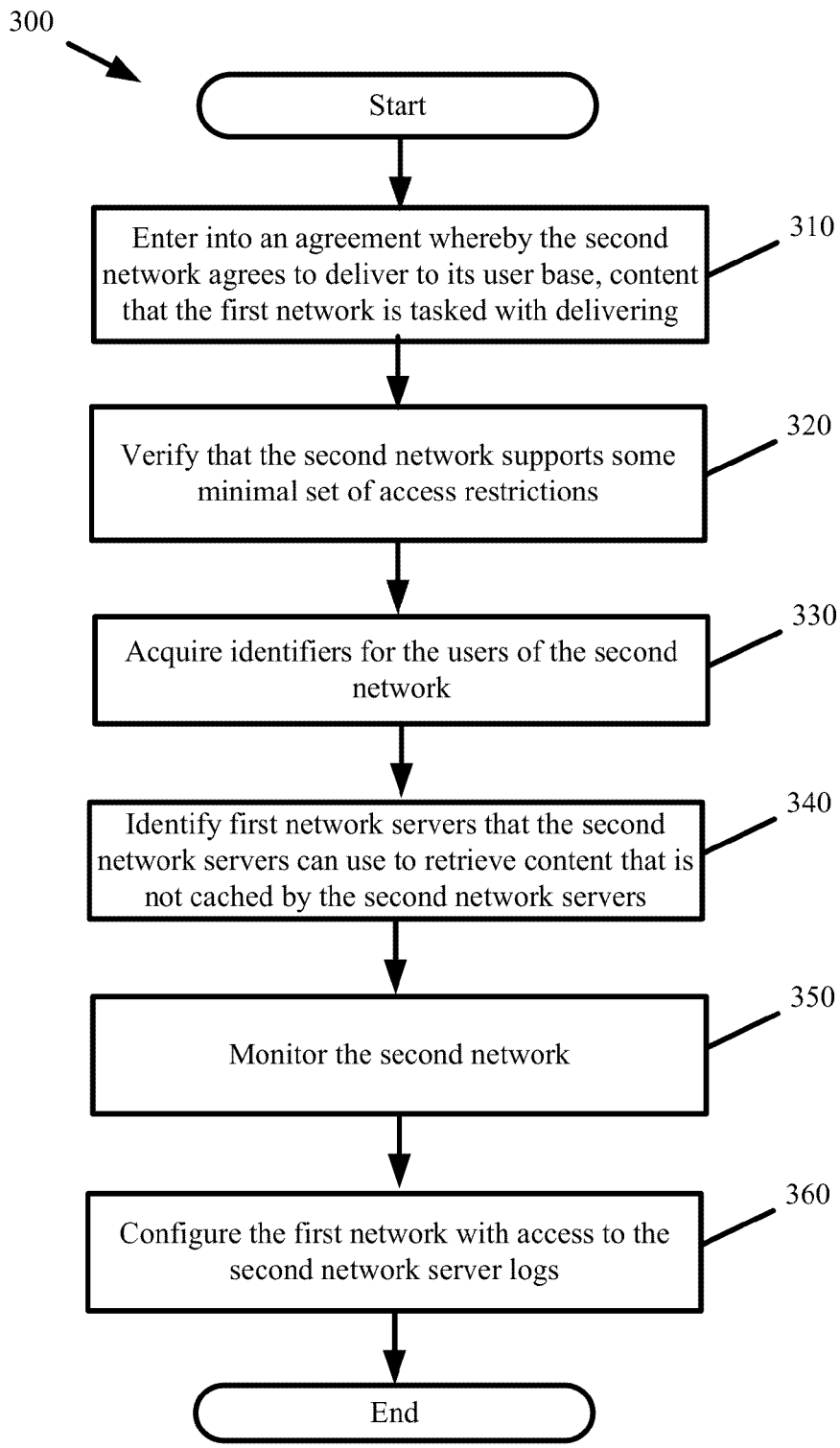
FIG. 3 presents a process by which a second network becomes an affiliated local delivery partner of a first network in accordance with some embodiments.

In order to implement the systems and methods set forth herein, a first network first establishes partnerships with one or more second networks that can provide localized or optimized content delivery to different sets of users. FIG. 3 presents a process 300 by which a second network becomes an affiliated local delivery partner of a first network in accordance with some embodiments.

The process 300 commences by entering (at 310) into an agreement in which the second network agrees to deliver content on behalf of the first network. Usage quotas, limits, commits, cost, bandwidth, etc. may be specified as part of the agreement and can affect how and when the first network uses the second network for content delivery. The agreement benefits the first network as it can now leverage the resources of the second network for content delivery to the second network's user base. The agreement can also establish various incentives for the second network including improved experiences for the second network user base, less costly access to external data networks, and fee generation as a result of performing content delivery for the first network and its content provider customers. The agreement can also be reciprocal in nature such that the first network can pass requesting users to the second network in order for those users to receive optimized or localized content delivery from the second network and the second network can pass requesting users to the first network in order for those users to receive optimized or localized content delivery from the first network. Other incentives for the first network and the affiliated second network partner will become apparent from the discussion below.

In some embodiments, the process verifies (at 320) that the second network supports some minimal set of access restrictions. In some other embodiments, the first network configures the second network with the minimal set of access restrictions. As long as each of the second network partners of the first network support one common access restriction, the first network can move most of the intelligence for effectuating any and all content provider configured access restrictions upstream to the first network such that this intelligence need not be present or effectuated by any of the downstream second network partners of the first network. Rather, the second networks need only confirm that a requesting user has already been authenticated by the first network in a secure manner. For example, after the first network performs an exhaustive authentication of a user, the first network can encode that user's IP address as a token that is included with the message passing the user from the first network to the second network. The second network need only decode the token and confirm that the requesting user's IP address matches the one decoded from the token. This greatly simplifies the authentication that the second networks have to perform while still ensuring that users do not gain unauthorized access to content at either the first or second networks unless the users satisfy any and all access restrictions configured to secure that content.

In order to identify which users are better served using resources of the second network rather than resources of the first network, the process acquires (at 330) identifiers for the users of the second network. In some embodiments, the identifiers include Internet Protocol (IP) addresses of the second network users, IP address blocks that the second network assigns to its users, addressing for gateways of the second network, and other identifiers such as Autonomous System (AS) numbers, device identifiers, etc. The second network may provide the identifiers to the first network. Alternatively, the first network can obtain the identifiers from various mapping tables or by performing reverse lookups including reverse Domain Name System (DNS) queries.

The process may optionally identify (at 340) for the second network, addressing to various servers of the first network. These are servers that the second network can use to retrieve content from should the second network servers not have the content cached.

The process begins monitoring (at 350) the second network. The monitoring of the second network can be conducted by the first network, the second network, various third party monitoring services (such as those provided by Cedexis, CatchPoint Systems, and Gomez Networks as some examples), or some combination thereof. The monitoring provides the first network with insight as to the performance of the second network. For instance, the monitoring can reveal if the second network and its various servers are experiencing high load, congestion, failure, etc. The first network can use the monitoring results as secondary considerations to geographic proximity in determining which, if any, of the second networks can provide optimal content delivery performance to a user that initially requests content from the first network.

The process configures (at 360) the first network with access to the second network server logs. This can include configuring push mechanisms by which the second network periodically passes the logs to the first network. This can alternatively include configuring pull mechanisms, whereby the first network is provided access credentials with which it can log in to the second network servers and pull the logs. The logs track what content the second network servers serve on behalf of the first network. In some embodiments, the first network integrates the second network logs with its own logs. The first network does so in order to generate a holistic account for a content provider that is a customer of the first network and whose content is served to various users using resources of the first network and the second network. From that holistic account, the first network can generate holistic reports regarding the delivery of the content provider customer as well as bill the content provider customer for the delivery of its content regardless of whether the content was delivered using first network resources or second network resources.

Figure 4:
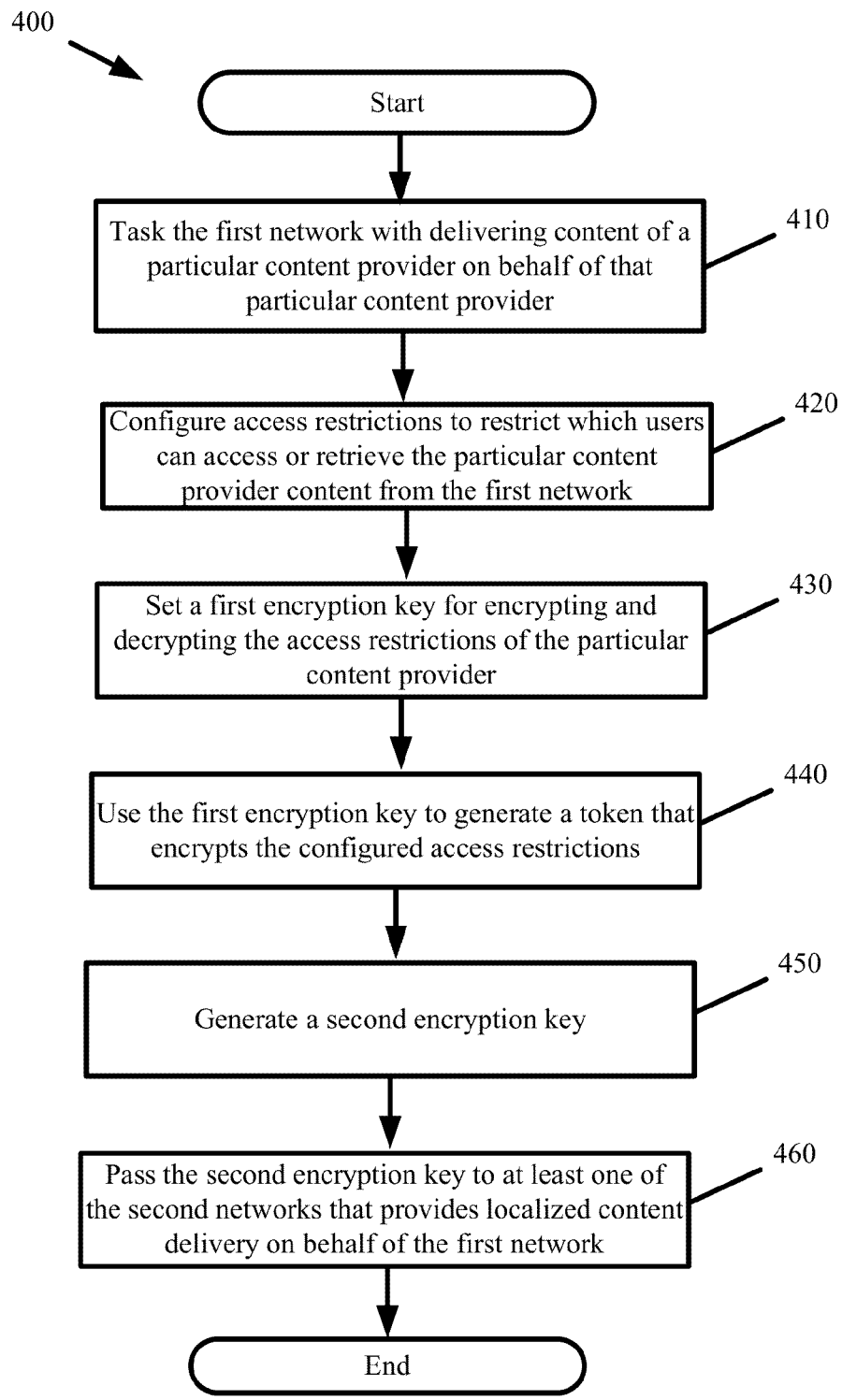
FIG. 4 presents a process for configuring the multi-phase token-based authentication scheme in accordance with some embodiments.

Once partnerships are established between the first network and various second networks, the first network configures the multi-phase token-based authentication scheme to ensure that any content provider specified access restrictions are effectuated not only at the first network initially receiving the user request, but also at any second network that the first network passes a user request to. This ensures that users cannot gain unauthorized access to content from either the first network or any of the second networks. FIG. 4 presents a process 400 for configuring the multi-phase token-based authentication scheme in accordance with some embodiments.

The process 400 commences by tasking (at 410) the first network with delivering content of a particular content provider on behalf of that particular content provider. This may include identifying specific content files that the first network is to cache from the particular content provider servers or other origin. This may also include preloading servers of the first network with the particular content provider content.

Once the particular content provider has identified the content that it wants delivered from the first network, the process next configures (at 420) one or more access restrictions to restrict which users can access the particular content provider content from the first network and which users are prevented from doing so. The particular content provider typically configures the access restrictions. A default set of access restrictions may automatically be configured when the particular content provider does not specify its own access restrictions. The access restrictions are typically configured using an online interface provided by the first network or through code or scripts that the particular content provider provides to the first network.

In some embodiments, the access restrictions set an expiration date for time-sensitive content, wherein the access restrictions allow the time-sensitive content to be accessible or retrievable within some specified time frame. In some embodiments, the access restrictions specify geo-blocking rules that allow or block user access to content based on the user's location. More specifically, in some embodiments, the access restrictions allow or block users to the particular content provider content by country, by host, by domain, by Internet Protocol (IP) address, by referrer, by protocol, etc. These are but some of the many access restrictions that any content provider customer of the first network can configure. A listing of all supported access restrictions is beyond the scope of this disclosure and is therefore omitted for simplicity.

The process then configures the first phase of the multi-phase token-based authentication scheme by setting (at 430) a first encryption key for encrypting and decrypting the access restrictions of the particular content provider. Step 430 can be skipped if a first encryption key has already been set for the particular content provider. In some embodiments, the first network automatically generates and assigns the first encryption key to the particular content provider. In some other embodiments, the particular content provider specifies a custom first encryption key. The first network associates the first encryption key with the particular content provider content or with an account, host name, or domain name of the particular content provider. This association allows the first network to retrieve the correct first encryption key when requests are received for content of different content providers.

In continuing with the configuration of the first phase, the process uses (at 440) the first encryption key to generate a token that encrypts the access restrictions configured at 420. In some embodiments, the token is a value or string of symbols and alphanumeric characters. For example, access restrictions allowing access to users in North America that are referred from the domain "*.trusteddomain.com" can be encrypted using the first encryption key into a token having the value "1ea45f3d". The token may be generated at the first network. Alternatively, a script or executable may be provided to the particular content provider so that it may generate its own tokens as needed. For any content that the particular content provider wishes to secure access to, the particular content provider updates the links that are used in requesting that content to include the token. For example, the above generated token "1ea45f3d" can be appended to the link "cp.firstnetwork.com/mycontent.flv" as a query string parameter to yield "cp.firstnetwork.com/mycontent.flv?1ea45f3d". Thereafter, access to the "cp.firstnnetwork.com/mycontent.flv" content is restricted to users that can satisfy the above specified access restrictions that were encrypted to produce the "1ea45f3d" token. Other link updates may include changing of the host or domain name such that the links point to the first network instead of the host or domain name of the particular content provider or other hosting service provider. This can alternatively be done by generating a Domain Name System (DNS) alias, such as CNAME, such that the host or domain name of the particular content provider resolves to the first network.

From any user request, the first network should be able to identify the identity of the content provider whose content is being requested. Specifically, the first network should be able to identify the identity of a content provider from the URL of the user request. This allows the first network to retrieve the correct first encryption key in order to decrypt any token included with the request. The identity of the content provider can be included as part of the host or domain name of the URL. Alternatively, the identity of the content provider can be included as part of the URL path. For example, the code "ABC123" in the URL path "firstnetwork.com/ABC123/images/pic.jpg" may identify a particular content provider.

At this stage, the first phase of the multi-phase token-based authentication scheme is configured and can be effectuated at the first network. However, in order for the first network to leverage the content delivery capabilities of the second networks in a secure manner, the second networks must also authenticate any users that the first network passes to the second networks whether by redirection, DNS resolution, request forwarding, or some other means. Accordingly, the second phase of the scheme is configured to enable the first network to pass the users to the second networks with an encrypted second set of access restrictions that each of the second networks can decrypt and effectuate.

As part of configuring the second phase of the scheme, the process generates (at 450) a second encryption key. The process passes (at 460) the second encryption key to at least one of the second networks that provides localized content delivery on behalf of the first network. In some embodiments, the second encryption key is different than the first encryption key in order to ensure that the particular content provider's key is not exposed to any external parties. The same second encryption key may be passed to each of the second networks. However for security reasons, it is preferable that the first network configures a different second encryption key for each of the second networks. In some embodiments, only one second encryption key is provided to each of the second networks, with the second encryption key being used to effectuate access restrictions at the second networks for any of the content provider customers of the first network.

The first network uses the second encryption key to encrypt access restrictions that it wants the second network to effectuate. These access restrictions are encrypted as a second token. The second token replaces the first token when passing a user request from the first network to the second network. In some embodiments, the first network generates a redirect message with a rewritten URL and the second token, wherein the rewritten URL redirects the user request to the second network that will provide localized delivery of the requested content on behalf of the first network to the requesting user. The second network uses the second encryption key to decrypt the access restrictions specified as part of the second token.

Figure 5:
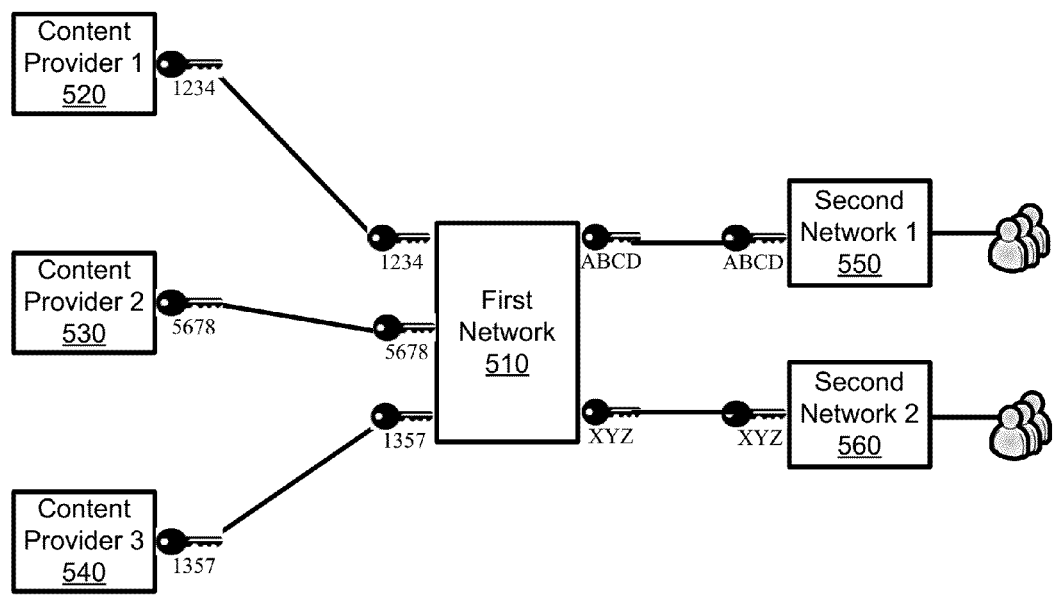
FIG. 5 conceptually depicts the encryption key assignment for the multi-phase token-based authentication scheme of some embodiments.

The encryption key assignment for the multi-phase token-based authentication scheme of some embodiments is conceptually depicted in FIG. 5. This figure illustrates configuring a different first encryption key at the first network 510 for each of three content provider customers 520, 530, and 540 of the first network 510 and configuring a different second encryption key for each of two second networks 550 and 560 that the first network 510 partners with and leverages for localized content delivery.

Some embodiments optimize the multi-phase token-based authentication scheme so that the same user authentication is not performed at the first network and at the second network that the first network passes the user request to. It should be apparent that it would be redundant to effectuate the same authentication at both the first network and the second network. This redundancy results in unnecessary overhead and delay. For example, if a content provider configures access restrictions that limit user access to users that are located in North America, are referred to from a particular domain, and operate using a particular device, it is unnecessary to perform this same authentication at the first and second networks. Accordingly, in some embodiments, the first network performs a first user authentication and the second network performs a second different user authentication.

In some embodiments, the first authentication performed by the first network involves effectuating any and all access restrictions that are configured by a particular content provider whose content is being requested. If the user is authenticated at the first network, the first network then encrypts a single access restriction or a smaller set of access restrictions in the second token for the second authentication that is to be performed by the selected second network. In some embodiments, one access restriction for the second token involves a time expiration restriction that allows the rewritten URL to be used to retrieve the requested content from the second network only for a short duration after the redirection. In some embodiments, one access restriction for the second token involves an IP address restriction that allows only the requesting user's IP address to be used to retrieve the requested content from the second network using the rewritten URL and the specific second token. If the rewritten URL and the specific second token are used by another user having a different IP address, the second network will deny that user access to the content during the second authentication. In some embodiments, the first network can also specify in the second token, certain access restrictions that it does not want the second network to perform.

Figure 6:
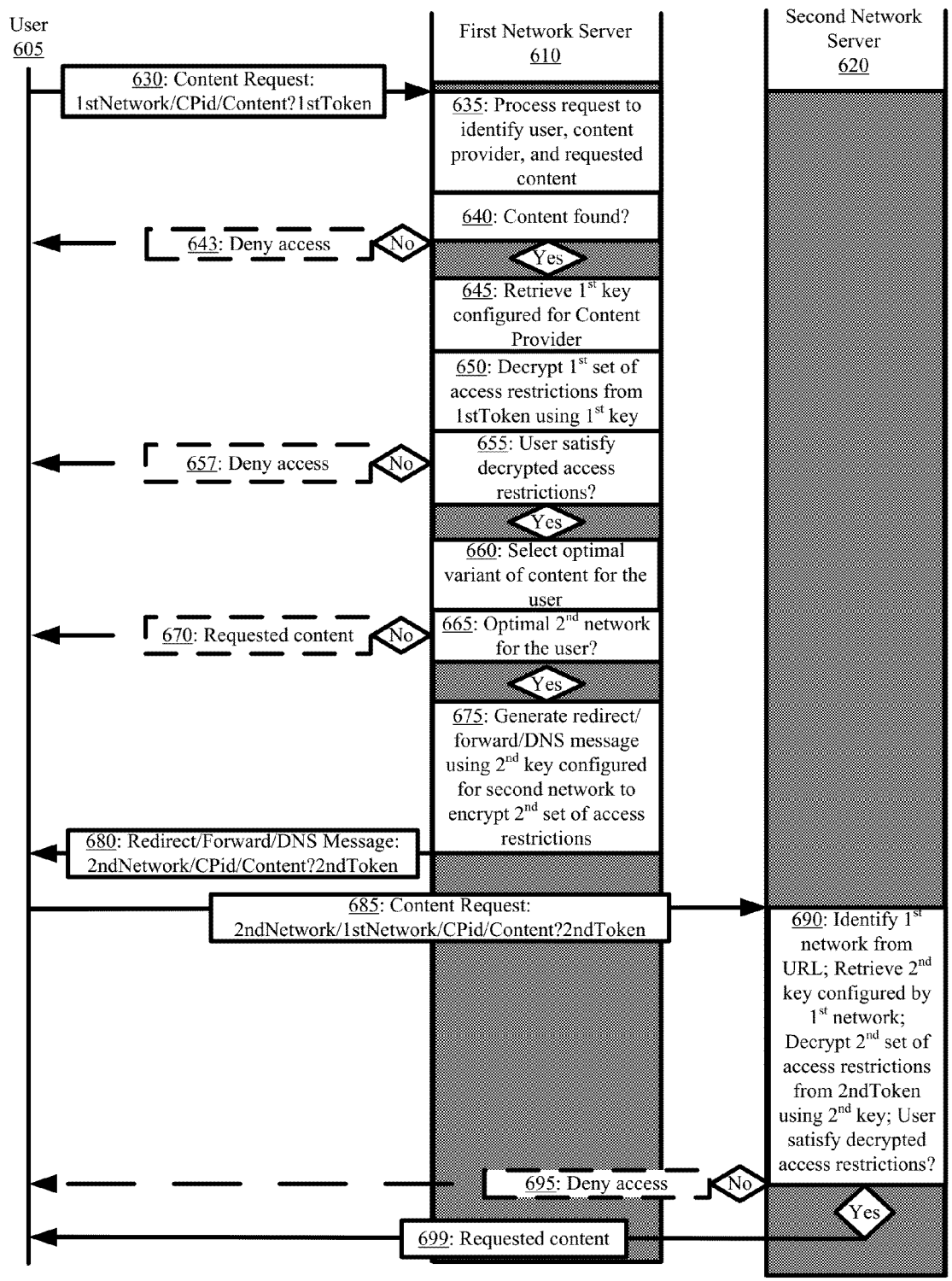
FIG. 6 demonstrates the multi-phase token-based authentication scheme of some embodiments in effect.

FIG. 6 demonstrates the multi-phase token-based authentication scheme of some embodiments in effect. More specifically, the figures demonstrates using the multi-phase token-based authentication scheme to effectuate access restrictions when a first network receives a user request for content and the first network leverages a second network to provide localized delivery of the requested content on its behalf. The figure demonstrates a message exchange between a user 605, a first server 610 of a first network, and a second server 620 of a second network that provides localized content delivery to the user 605 on behalf of the first network. It is assumed that the first and second phases of the multi-phase token-based authentication scheme have been configured per the discussion above.

The message exchange commences with the user 605 issuing (at 630) a content request. The request is for content that a particular content provider has tasked the first network to deliver. The particular content provider has restricted the delivery of that content to users that satisfy various access restrictions configured by that particular content provider. Accordingly, the content request includes a URL and a query string parameter for a first token that encrypts the configured access restrictions. The URL identifies a name for the content being requested as well as a host or domain name for where the content is accessible. In this case, since the first network is tasked with delivering the particular content provider's content, the URL resolves to the first network with the request ultimately routing to the first network server 610.

The first network server 610 processes (at 635) the request and, more specifically, the URL of the request. The processing identifies the requesting user 605, the content being requested, the content provider whose content is being requested, and the first token securing access to the content. The requesting user 605 is identified based on any one or more of the user's IP address, port number, autonomous system (AS) number, a device or client identifier, and media access control (MAC) address as some examples. These identifiers can be obtained from the request header. The content provider can be identified from the host or domain name of the request URL or from a customer number that is included in the request path.

Next, the first network server 610 verifies (at 640) that the first network is tasked with delivery of the requested content. The verification is conducted based on the content filename or the content provider identifier. If the first network does not recognize the content being requested (i.e., the first network is not tasked with delivery of the requested content) or the content provider is not a customer of the first network, the first network server 610 denies the request by passing (at 643) a 404 or not found error message to the user 605. Otherwise, the first network server 610 retrieves (at 645) the correct first encryption key for the first token based on the identity of the content provider and decrypts (at 650) the first token using the first encryption key. Decrypting the first token yields a first set of access restrictions.

The first network server 610 authenticates (at 655) user 605 access based on whether the user 605 satisfies this first set of access restrictions. As noted before, this can include enforcing geo-blocking rules, time restrictions, referral restrictions, etc. For instance, geo-blocking rules look to the user 605 identification information, such as the user's IP address or an AS number, to determine whether the user 605 operates from within a region that is restricted from accessing the requested content.

If the user 605 does not satisfy one or more of the access restrictions, the first network server 610 denies (at 657) the user 605 access to the requested content. In some such cases, the first network server 610 may provide an error message to the user 605, provide alternate content, or require the user 605 to perform a secondary authentication.

If the user 605 satisfies all the access restrictions, the first network server 610 then selects (at 660) an optimal version of the requested content to serve to the user 605. This can including selecting one of several available encodings of the content that is best optimized for the user 605 with each encoding offering the content at a different resolution, compression level, bit rate, or other file size variant. To determine the optimal version of the requested content for the user 605, the first network server 610 may obtain additional information on the user 605 such as information about the user device and available bandwidth to the user 605 as some examples. Some such information may be included with the request as query string parameters or within the request header. In some embodiments, the additional information is determined by directly or indirectly monitoring the user 605 or the network path to the user 605.

The first network server 610 next determines (at 665) whether the first network is partnered with a second network that can provide better content delivery performance to the user 605 than the first network. To do so, the first network server 610 obtains the user 605 identifying information and determines whether the user 605 originates the request from within or adjacent to one of the second networks that are partnered with the first network. In other words, the first network server 610 determines if there is a second network partner that is more geographically proximate to the user 605 than the first network. This determination can be based on the user's IP address or other identifiers associated with the user 605. As noted above with reference to FIG. 3, the first network server 610 stores or has access to a mapping table that maps different user IP addresses to different second network partners of the first network. Alternatively, the first network server 610 could perform a reverse DNS lookup to identify which external network the user 605 originates from. In some embodiments, the first network server 610 then looks to supplemental performance statistics to validate the performance of each of the identified second networks. As was also noted above, the first network monitors each of its second network partners in order to have insight on the loads, performance, congestion, and various other performance metrics of those second networks. From the monitoring results, the first network server 610 validates whether the second network that the user 605 operates in or is adjacent to can in fact provide better content delivery performance than the first network or other second network partners. It may be the case, that a second network partner that is local to the user 605 is experiencing failure or high demand and is therefore likely to provide worse content delivery performance to the user 605 than a more distant network such as the first network. Next, the first network server 610 validates usage of any identified second network according to a set of secondary considerations. The first network may have quotas that limit the amount of first network content that can be delivered from the various second network partners. Therefore, to avoid overrunning these quotas or limits, the first network server 610 may not select a second partner even when that partner has been determined to provide optimal content delivery performance. In other cases, cost considerations can limit how often a first network leverages a specific second network for content delivery. In summary, the first network server 610 may identify an optimal second network partner not only in terms of performance, but also cost, quotas, and other secondary considerations in some embodiments.

When the first network server 610 determines that none of the second networks is optimal relative to the first network, the first network server 610 serves (at 670) the requested content in response to the user request. In some embodiments, prior to serving the content, the first network server 610 performs a server selection algorithm to ensure that it is the best server of the first network to serve the requested content. If so, the first network server 610 serves the requested content. Otherwise, the first network server 610 redirects or forwards the request to another first network server that then serves the requested content to the user 605. This other server may reside in the same PoP or a different POP of the first network as the first network server 610.

When the first network server 610 determines that a particular second network is optimal to respond to the user 605 request relative to the first network and other second network partners, the first network server 610 generates (at 675) a message to pass the user 605 from the first network to that particular second network. This message can be any of a redirect, forward, or DNS message. For simplicity, the discussion continues by describing an embodiment whereby the user is redirected from the first network to the particular second network. To do so, the first network server 610 rewrites the request URL to point to the particular second network while also identifying the optimal version of the content that the first network server 610 selected for the user 605. This can include changing the content file name or introducing additional query string parameters in the rewritten URL. This, in conjunction with authenticating the user 605 with the first set of access restrictions, moves most of the processing overhead and complexity upstream such that it is performed once at the first network, relieving the downstream second networks from such efforts, and thereby reducing the common set of access restrictions that the second networks need to support in order to partner with the first network.

As part of generating the message to pass the user 605 from the first network to the particular second network, the first network server 610 obtains the second encryption key that the first network previously exchanged with the particular second network. The first network server 610 uses the second encryption key to generate a second token that encrypts at least one second access restriction that the particular second network is to effectuate in order to ensure that only authenticated users can gain access to the content. Again, to preserve the complexity upstream at the first network and relieve the downstream second networks from added complexity, the at least one second access restriction differs from the first set of access restrictions and requires a much simpler authentication. In some embodiments, the at least one second access restriction is a single rule that all second network partners of the first network support including, for example, authenticating a requesting user by ensuring that the user's IP address matches an allowed IP address specified as part of the second access restriction. In some embodiments, the at least one second access restriction can also identify access restrictions that the second networks need not perform. For example, when the first network authenticates the user 605 according to geo-blocking rules, then the second access restriction can identify that the second network need not redundantly authenticate the user 605 using the same geo-blocking rules. In any case, the second token encrypting the at least one second access restriction is included with the rewritten URL. For instance, the initial request may specify "www.firstnetwork.com/ABC123/images/picjpg?4291032" and the redirect message for the same request may specify "www.secondnetwork.com/firstnetwork/ABC123/images/pic.jpg?EWSZ". The first network server 610 then passes (at 680) the redirect message back to the user 605.

The user 605 receives the redirect message and reissues (at 685) the request. The rewritten URL causes the reissued request to resolve and route to the second network server 620. The second network server 620 processes (at 690) the rewritten URL to determine that the request was redirected from the first network. Based on this determination, the second network server 620 knows to retrieve the second encryption key that was provided to the second network by the first network. The second network server 620 uses the second encryption key to decrypt the second token. The second network server 620 then authenticates the user 605 using the access restrictions that were decrypted from the second token.

If the second network server 620 is unable to authenticate the user 605, the second network server 620 denies (at 695) the user 605 access. In so doing, the second network server 620 may provide an error message to the user 605, provide alternate content, or require the user 605 to perform a secondary authentication.

If the second network server 620 is able to successfully authenticate the user 605, the second network server 620 serves (at 699) the requested content to the user and tracks the delivery and delivery performance of the content to a server log. Specifically, the delivery and delivery performance may be tracked under an account that is created for the first network. As will be explained below, the first network can then parse the logs to attribute the delivery and delivery performance to the appropriate content provider customer of the first network. When the requested content is not locally cached at the second network server 620, the second network server 620 may retrieve the content from the first network or directly from the originating content provider.

The second network server 620 may pass the user 605 back to the first network if for some reason the second network server 620 is unable to fulfill the user 605 request. This may occur if the second network is subject to different geo-blocking rules than the first network, suffers a failure that the first network is unaware of, or cannot access the origin to retrieve the content as some examples. In such cases, the first network may identify that the user was redirected to the first network from a second network partner and serves the requested content itself. Any token included with requests redirected from a second network partner can be ignored or decrypted using the corresponding second encryption key exchanged with that second network partner.

Some embodiments introduce a cookie when serving the content from the second network server 620 to the user 605. The cookie is provided in instances where the client issues multiple requests in order to obtain all of the content being requested. For example, when serving media content (e.g., video), the media content may be broken into several chunks with the user issuing requests for different byte ranges of the content corresponding to the different chunks. Clearly, it is redundant and wasteful to perform the multi-phase authentication scheme for each such request. It is also redundant and wasteful for the user to issue each request to the first network only to have the first network pass the user to the second network. Another issue is that the client may be unable to securely issue the subsequent requests directly to the second network as the client is only ever provided the first token that is encrypted with a first encryption key. In preferred embodiments, the first network does not expose this first encryption key to the second network partners. Consequently, the second networks are unable to decrypt any token encrypted with that first encryption key. Even if the second network could decrypt the first token, there is no guarantee that the second network supports the first set of access restrictions specified therein.

Figure 7:
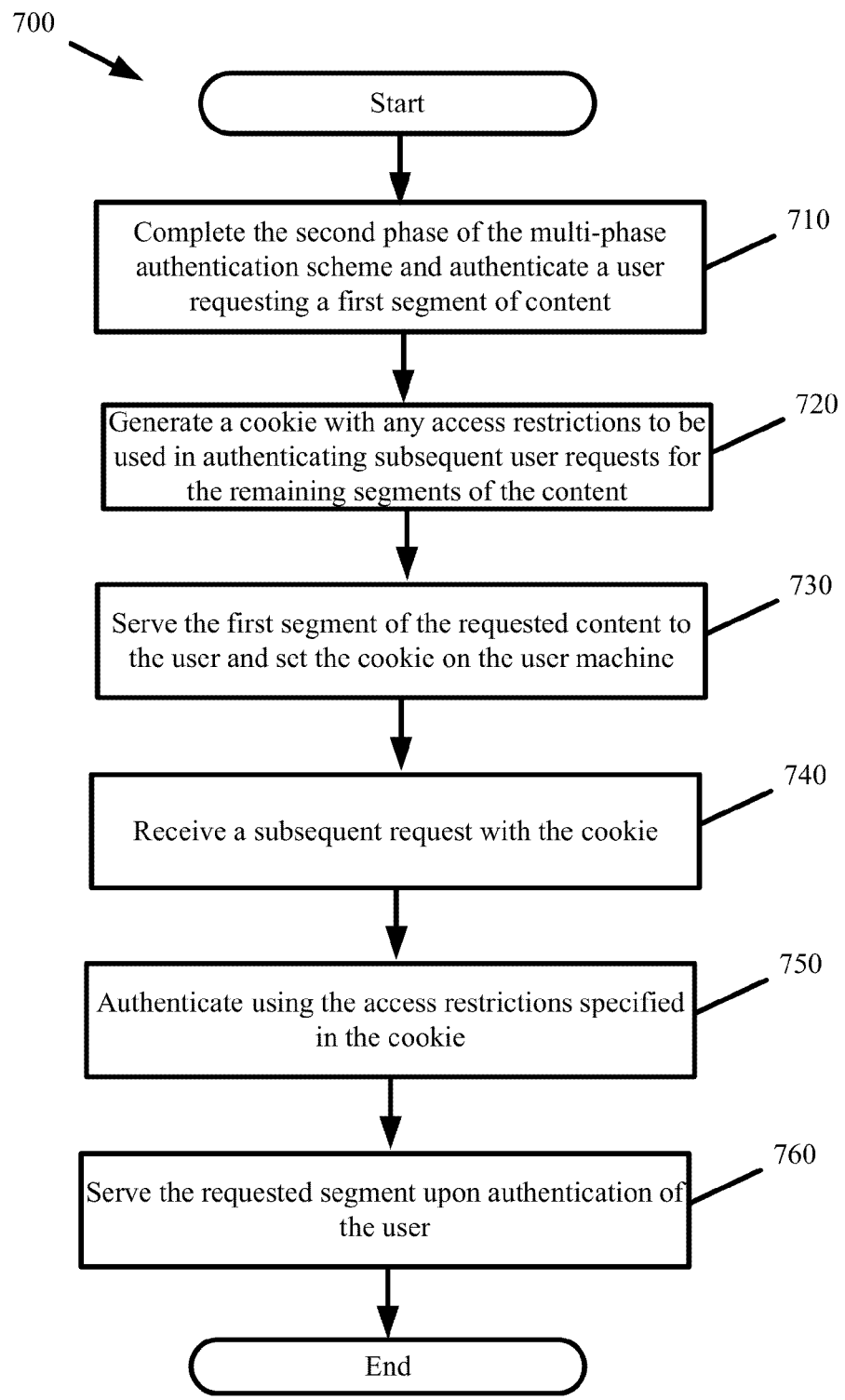
FIG. 7 presents a process for introducing a cookie and using the cookie to effectuate access restrictions for subsequent requests directed to remaining segments of the same content.

Accordingly, some embodiments perform process 700 of FIG. 7 to introduce a cookie and use the cookie to effectuate access restrictions for subsequent requests directed to remaining segments of the same content. The process commences when a second network partner completes (at 710) the second phase of the multi-phase authentication scheme and authenticates a user requesting a first segment of content. The process generates (at 720) a cookie with the access restrictions that are to be used in the same session when authenticating subsequent user requests for the remaining segments of the content. This will likely include the at least one second access restriction that is extracted from the second token included as part of the redirected user request.

The process serves (at 730) the first segment of the requested content to the user and sets the cookie on the user machine. All subsequent user issued requests for the same session to retrieve the remaining segments of the content will include the cookie. When the process receives (at 740) a subsequent request with the cookie, the request and requesting user are authenticated (at 750) using the access restrictions specified in the cookie. Any tokens associated with these subsequent requests may be ignored if the cookie is provided with the requests. The process serves (at 760) the requested segment upon authentication of the user. This continues until all segments have been completely served at which point the cookie is removed from the user machine or the user or server terminates the session.

Thusfar, the embodiments have been described to be unidirectional, wherein a first network passes user requests to a second network. However, these embodiments can be modified for bidirectionality, whereby any first network can act as a second network partner and any second network can act as a first network. In other words, the roles of the first and second networks can be switched. The role reversal can be supported using already exchanged encryption keys and by having a reciprocal agreement established between the two networks.

In some embodiments, a first network aggregates server logs from its second network partners. The first network processes the second network server logs in conjunction with server logs of the first network in order to derive a holistic account for content provider content that is delivered by the first and second networks. Performance metrics can then report on how quickly content provider content was delivered to various users or the aggregate amount of content that was delivered. Additionally, the first network can use the holistic account to accurately bill its content provider customers for all content delivered using the first and second network resources.

The log aggregation can be performed using push or pull mechanisms. In some embodiments, the second network is configured to periodically push one or more server logs to the first network for processing. In some embodiments, the second network configures the first network with access to the second network server logs. The first network can then periodically login to the second network servers and pull the logs. The second network server logs can then be combined with the first network server logs in order to generate the holistic performance reports and billing.

In some embodiments, all content that a second network partner serves on behalf different content provider customers of a first network is tracked under a single account that the second network partner creates for the first network. It is then up to the first network to parse the logs, identify which log entries involve content that the first content is tasked with delivering, and then identify which log entries are pertinent to which content provider customers of the first network. The entries can then entered to the corresponding content provider logs that the first network maintains for each of its customers. This greatly reduces the configuration overhead at each of the second network partners.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
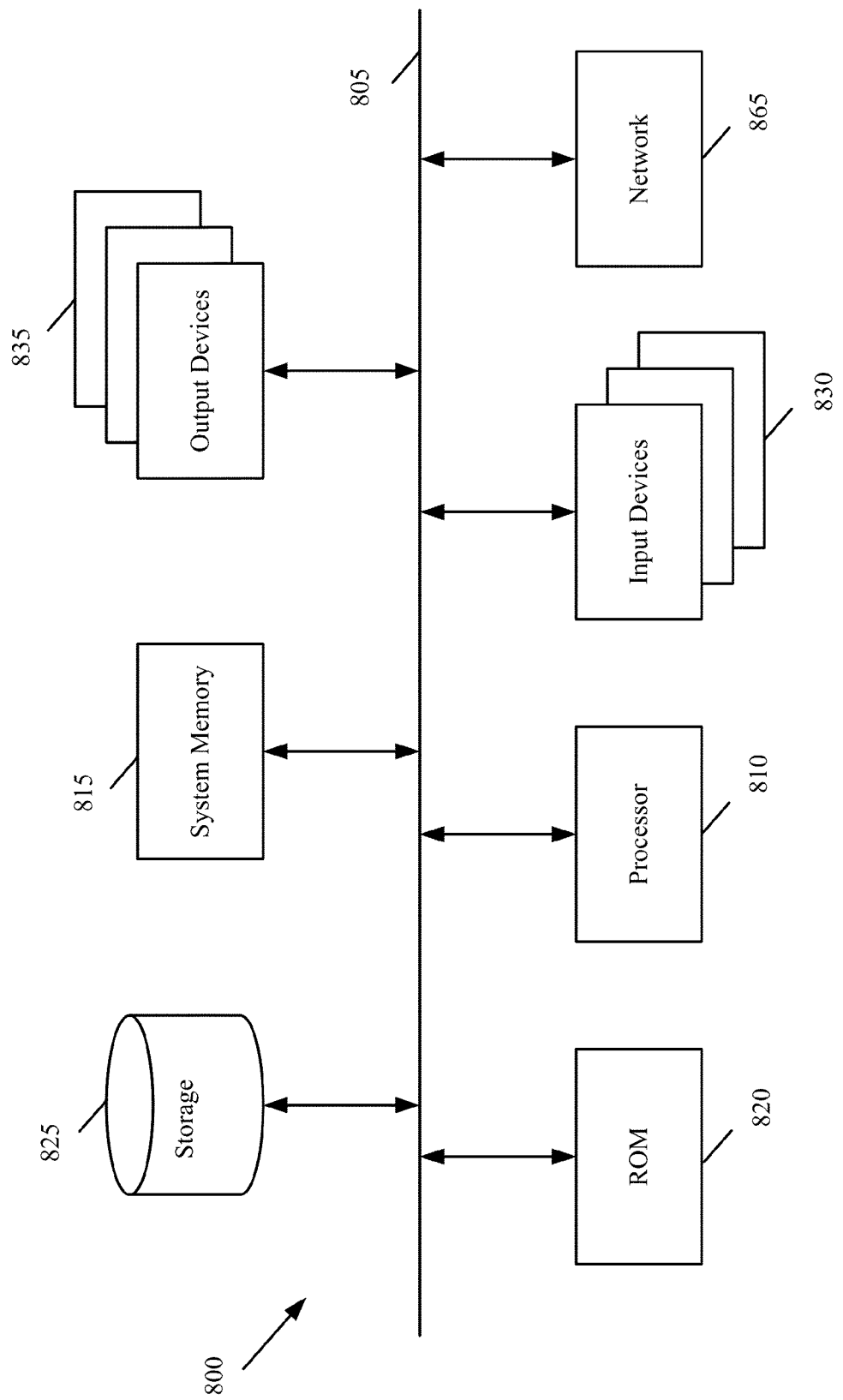
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., servers of the first and second networks). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices (also called "cursor control devices"). The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method with which a first network provides delivery of secured content from a second network, the computer-implemented method comprising:
    receiving a content request from a user at the first network, the content request comprising (i) a first identifier identifying the user, (ii) a second identifier identifying content being requested by the user and identifying the first network as a source for said content, and (iii) a first token encrypting at least a first access restriction;
    extracting at a server of the first network, the first access restriction by decrypting the first token using a first encryption key;
    authenticating the user at the first network based on the first access restriction;
    determining from the first identifier, a second network that provides better content delivery performance to the user than the first network, wherein the second network operates at least one server independent of the first network;
    generating a message comprising (i) a third identifier identifying said content and the second network as the source for said content and (ii) a second token encrypting at least a second access restriction using a second encryption key that the first network exchanges with the second network and that is different than the first encryption key; and
    transferring the user from the first network to the second network by passing the message to the user.

2. The computer-implemented method of claim 1, wherein transferring the user comprises any of redirecting and forwarding the user from the first network to the second network for secondary authentication of the user at the second network based on the second access restriction and delivery of said content from the second network upon the user successfully completing the secondary authentication.

3. The computer-implemented method of claim 1, wherein the second token is used in performing a secondary authentication of the user at the second network prior to granting the user access to the content.

4. The computer-implemented method of claim 1 further comprising passing a message from the first network to the user denying the user access to said content when the user does not satisfy the first access restriction.

5. The computer-implemented method of claim 1 further comprising receiving a log from the second network at the first network, the log comprising statistics tracking delivery of said content from a server of the second network to the user.

6. The computer-implemented method of claim 5 further comprising billing a provider of said content based on the statistics from the log of the second network server and at least one log of a first network server.

7. The computer-implemented method of claim 1, wherein the first network is a content delivery network (CDN) comprising a plurality of distributed points-of-presence (PoPs) providing content delivery and the second network is a service provider that provides the user with network access.

8. The computer-implemented method of claim 1 further comprising configuring the first encryption key for a provider of the content without exposing the first encryption key to the second network.

9. A computer-implemented method performed by at least one machine of a first network that leverages resources of a plurality of second networks in order to optimize content delivery to different sets of users, the method comprising:
    receiving a first access restriction that a first content provider configures to restrict user access to first content provider content and a second access restriction that a second content provider configures to restrict user access to second content provider content;
    determining a third access restriction that at least two of the plurality of second networks support, wherein the third access restriction is not specified by the first content provider or the second content provider;

receiving at the first network, a request for content from a user;

authenticating at the first network, the user using the first access restriction when the request is for the first content provider content and using the second access restriction when the request is for the second content provider content;

transferring the user from the first network to a particular second network from the plurality of second networks that provides optimized delivery of the content to the user, wherein said transferring encodes the third access restriction that the particular second network is to use in authenticating the user for access to the content from the particular second network.

10. The computer-implemented method of claim 9, wherein the particular second network provides the content to the user upon successfully authenticating the user using the third access restriction encoded as part of said transferring.

11. The computer-implemented method of claim 9, wherein said transforming comprises passing any of a redirect message, forwarding message, and Domain Name System (DNS) message with a token encoding the third access restriction.

12. The computer-implemented method of claim 9 further comprising denying the user access at the first network when the user does not satisfy the first access restriction when the request is for the first content provider content.

13. The computer-implemented method of claim 12 further comprising denying the user access at the particular second network when the user does not satisfy the third access restriction.

14. The computer-implemented method of claim 9, wherein the first access restriction specifies a geo-blocking rule restricting user access based on region and the third access restriction specifies a rule restricting user access based on IP address of the user.

15. The computer-implemented method of claim 9, wherein receiving the request comprises receiving a token encrypting the first access restriction according to a first encryption key that is exchanged between the first content provider and the first network when the request is for the first content provider content, and wherein the first encryption key is not exposed to the particular second network.

16. The computer-implemented method of claim 15, wherein receiving the request further comprises receiving a token encrypting the second access restriction according to a second encryption key that is exchanged between the second content provider and the first network when the request is for the second content provider content, and wherein the second encryption key is not exposed to the particular second network.

17. The computer-implemented method of claim 15, wherein said transferring comprises encoding the third access restriction as a token using a different second encryption key that is exchanged between the first network and the particular second network and that is not exposed to the particular content provider and passing a message with said token from the first network to the user.

18. A computer-implemented method with which a first network provides delivery of secured content from a second network, the computer-implemented method comprising:

receiving at the first network, a request for content of a particular content provider, the request comprising a first token;

decrypting the first token using a particular first encryption key that is configured for the particular content provider, said decrypting extracting from the first token, at least a first access restriction that the particular content provider configures to restrict user access to the content;

passing a message to the user in response to successfully authenticating the user at the first network according to the first set of access restrictions, the message comprising an identifier to the second network from which the user is to access the content and a second token encrypting a different second access restriction that the first network configures to restrict user access to the content, wherein the second token is encrypted using a second encryption key that the first network exchanges with the second network;

receiving at the first network, a log from the second network tracking delivery of the content under an account of the first network; and billing the particular content provider based on the delivery of the content that is tracked to the log under the account of the first network.

19. The computer-implemented method of claim 18 further comprising parsing the log and attributing any delivery under the account of the first network that is related to the particular content provider content to the particular content provider.

20. The computer-implemented method of claim 18 further comprising generating a performance report for the particular content provider at the first network based in part on the delivery of the content that is tracked to the log.

* * * * *